United States Patent
Stettin et al.

(10) Patent No.: US 8,959,252 B2
(45) Date of Patent: Feb. 17, 2015

(54) METHOD FOR CONFIGURING A FIELD DEVICE AND CORRESPONDING SYSTEM FOR PARAMETERIZATION

(71) Applicant: KROHNE Messtechnik GmbH, Duisburg (DE)

(72) Inventors: Gerd Stettin, Unterreichenbach (DE); Michael Gerding, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 13/724,454

(22) Filed: Dec. 21, 2012

(65) Prior Publication Data

US 2014/0059252 A1 Feb. 27, 2014

(30) Foreign Application Priority Data

Aug. 21, 2012 (DE) .......................... 10 2012 016 406

(51) Int. Cl.
*G06F 13/10* (2006.01)
*G05B 19/042* (2006.01)

(52) U.S. Cl.
CPC .......... *G06F 13/102* (2013.01); *G05B 19/0426* (2013.01)
USPC .......................................................... 710/8

(58) Field of Classification Search
None
See application file for complete search history.

(56) References Cited

U.S. PATENT DOCUMENTS

| | | | |
|---|---|---|---|
| 6,434,500 B1 * | 8/2002 | Boehne et al. | 702/120 |
| 6,445,965 B1 | 9/2002 | Mühlbauer | |
| 7,521,944 B2 * | 4/2009 | Wehrs | 324/694 |
| 2005/0047331 A1 * | 3/2005 | Tapperson et al. | 370/225 |
| 2007/0124115 A1 | 5/2007 | Buttner et al. | |
| 2012/0020430 A1 | 1/2012 | Haase et al. | |

FOREIGN PATENT DOCUMENTS

| | | |
|---|---|---|
| EP | 2 246 761 A1 | 11/2010 |
| WO | 2006/053668 A2 | 5/2006 |
| WO | 2009/141279 A1 | 11/2009 |
| WO | 2012/079902 A1 | 6/2012 |

OTHER PUBLICATIONS

English Machine Translation of WO 2009/141279, Birgel et al.*

* cited by examiner

*Primary Examiner* — Idriss N Alrobaye
*Assistant Examiner* — Dayton Lewis-Taylor
(74) *Attorney, Agent, or Firm* — Roberts Mlotkowski Safran & Cole, P.C.; David S. Safran

(57) ABSTRACT

To provide a method for configuring a field device, and a corresponding parameterization system, that enables secure transfer of parameter values via a potentially unsafe data link the method establishes a data link (3) between the field device and a parameterization unit, a parameterization value is transmitted by the parameterization unit to the field device, a parameterization value is received by the field device. Furthermore, a first test value is generated by the parameterization unit from the parameterization value, a second test value is generated by the field device from the received parameterization value. Then, the test values are compared to one another.

8 Claims, 3 Drawing Sheets

METHOD FOR CONFIGURING A FIELD DEVICE AND CORRESPONDING SYSTEM FOR PARAMETERIZATION

BACKGROUND OF THE INVENTION

1. Field of the Invention

The invention relates to a method for configuring a field device. Furthermore, the invention relates to a system for parameterization of a field device with a parameterization unit.

2. Description of Related Art

In modern process automation, field devices are used mostly for monitoring process variables and as actuators for influencing the processes. Field buses, for example, are used for the communication between the field devices and a control room, for which different data protocols are used for transmitting measurement and control data. In addition, it is usually also provided that the field devices themselves have display units, so-called screens, via which, for example, the measurement data or other values of the field device can be represented. Thus, many field devices have at least two output options: on the one hand, an interface for connecting the field devices to a field bus connection for data link, and, on the other hand, a display unit for on-site presentation. Occasionally, an input device, e.g., in the form of some buttons, is present on the field device or, for example, a configuration unit in the form of a so-called hand-held device (PDA) or a portable computer in the form of a laptop can be connected directly via a service interface.

Problems can arise when the data connection is not secure and when the use of the field device is relative to security. If the field device is mainly being configured, i.e., if it is being set to how it should function, then it is extremely important that the parameter values are set safely in the field device. The respective safety requirements, and if applicable, the requirements to meet the SIL (Safety Integrity Level) standard, important especially in process automation, are relevant.

The problem of unreliable data links or data storage, particularly in applications relative to safety, has already been dealt with as a part of the prior art.

The U.S. Pat. No. 6,445,965 B1 discloses a method for the monitoring of safe conditions of devices within a system. The devices are, in each case, depending on the type of operation, assigned parameters that are to be monitored by sensors. For easy interchangeability of components, the parameter values are stored in a data memory. A checksum is generated and compared with the current values so that the parameter values cannot be changed without authorization.

In U.S. Patent Application Publication 2007/0124115 A1, an automation system with field devices on a field bus is described, in which safety-related data are transmitted using different mechanisms, e.g., the use of checksums.

European Patent Application EP 2246761 A1 describes a method for monitoring the parameters of an automation component, wherein test values of the control unit and the component are compared to one another. The checksums are formed not using the parameter values, but rather using the difference between the newly set parameter values and the previous parameter values.

The International Patent Application Publication WO 2006/053668 A2 describes a method for configuration of a device, wherein the parameter values are retrieved at least once to check the device parameterization.

SUMMARY OF THE INVENTION

The primary object of the present invention is, thus, to provide an alternative method for configuring a field device—and a corresponding parameterization—that enables secure transmission of parameter values via a potentially unsafe data link.

The method according to the invention, in which the above object is met, is initially and essentially characterized by the following steps: At least one data link is established between the field device and the parameterization unit. This is, for example, only a temporarily established link or possibly a permanent connection, as, for example, given by a field bus, where the field device and the parameterization unit are permanently connected. If the parameterization unit is a hand-held device (i.e., a so-called PDA) or a service laptop, then the data link is preferably generated only for the time of the configuration. The parameterization unit is, in particular, in one design, a separate unit, independent of the field device. In the next step, at least one parameter value is transmitted from the parameterization unit to the field device, i.e., transmitted, in particular, via the generated data link. This parameter value is previously entered, for example, by an operator into the parameterization unit or selected from a list or taken from a data memory or from a control program, e.g., appropriately generated as part of the process in a control room for the comparison of different field devices in one system. At least one parameter value is received by the field device.

Because the data link is possibly uncertain, however, it is necessary to check whether the selected and transmitted parameter value is the same as the received parameter value. Thus, at least one first test value is generated by the parameterization unit at least from the at least one parameter value to be transmitted. The test value is, for example, a checksum or a so-called CRC (cyclic redundancy check). The test value can be generated after transmission, during transmission or in advance. At least one second test value is generated from the field device from the at least one received parameter value. In one design, the first and the second test values are generated in the same way, and in an alternative design, using different algorithms. The first and second test values are individually generated for each parameter value generated in one design, even if more parameter values are to be set on the field device. In an alternative design, the test values are generated for several parameter values.

Then, at least the first test value and the second test value are compared with one another, generating a comparison result. In the simplest case, the comparison result is either agreement or deviation. In the case of agreement, this means that the parameter value, or the parameter values has/have been transmitted correctly and the parameter values can be stored and used in the field device. Thus, for example, parameterization can be acknowledged on the field device. In the case of deviation, parameterization is possibly repeated or another data link is generated or the parameterization is canceled and the field device goes into a secure (default) state.

In one design, the second test value is output by the field device in an optically and/or acoustically and/or haptically and/or olfactorily registerable form. The field device, in this design, outputs the second test value generated by it in such a manner that it can be registered, i.e., recorded, by an operator located on site. This means that the field device is designed in such a manner that it can output its second test value via a corresponding method or interface in a broader sense. In one design, the output of the second test value takes place using a display unit of the field device. This second test value is then read by the operator and compared with the first test value of the parameter unit.

A design, which may also include the above, includes that the second test value is output by the field device via an additional data link differing from the data link between the field device and the parameterization unit and/or via a type of transmission differing from the type of transmission of the parameter value from the field device to the parameterization unit. Another type or another additional data link is implemented, in the aforementioned design, by the optical, acoustic, haptic or olfactory output, so far as the input of the at least one parameter value takes place via a different route, e.g., via a data interface. Since the data link and type of data transmission in the normal case are possibly not safe, the output of the second test value takes place via a different connection or a different type of data transmission in this design. This prevents a further error entering the data transmission at least via the same data link and the same type of communication.

In one design, it is provided that the second test value is supplied to the parameterization unit and that the first test value is compared to the second test value by the parameterization unit and a comparison result is generated from this. In this design, the parameterization unit monitors whether the parameter value arrives correctly at the field device. Alternatively, the comparison takes place via a third unit independent from the field device and the parameterization unit, which comprises, for example, an operator or a separate comparison unit. Depending on the type of comparison or authority for carrying out the comparison, the test values are output appropriately and, in particular, in a registerable or usable manner.

In one design, the first test value is output by the parameterization unit in an optically and/or acoustically and/or haptically and/or olfactorily registrable form. In this design, output of the—here first—test value by the parameterization unit is provided, which allows, in particular, an operator to recognize the first test value, i.e., to see or hear it, in particular.

A further design provides that the first test value is supplied to the field device and that the first test value is compared to the second test value by the field device and a comparison result is, thus, generated. In this design, the field device monitors whether it has correctly received the at least one parameter value. In one design, the parameterization unit outputs the first test value in such a manner that the test value can be supplied to the field device. Alternatively, a transmission unit is arranged between them or suitably becomes active. The recording of the first test value by the field device occurs via the data link between the parameterization unit and the field device for transmitting the at least one parameter value or via a separate input.

In one design, it is provided that, depending on the test result, the parameter value received by the field unit is set as a parameter value in the field device. In this design, depending on the comparison, i.e., depending on whether the two test values are the same or have the same information, the parameter value transmitted and received from the field device is determined as being usable for the further operation of the field device or, for example, is discarded.

In a further design, the first test value and the second test value, or only the first or the second test value is/are output as a current signal. This is as an alternative or addition to the output of at least one test value via, for example, a display unit or an interface separate from the data link. The output as a current signal or setting of a current value occurs, for example, based on the transmission of measured values as 4 . . . 20 mA signals. Alternatively, this signaling can also be achieved via the power supply to the field device or the parameterization unit. Possible signal outputs are an analog current output, a frequency output or a pulse output. An alternative is to convert any interface of the field device in a manner different than the normal manner, in order to be able to output the second test value specifically for the configuration.

Two exemplary variations of the parameterization method generally are: in a first variation, the test values are output so that an operator can register them on-site, e.g., via a display unit or via an acoustic signal of the test values. In a second variation, at least one test value is output as a current signal or a current value. The inspection of this test value can be carried out on site, for example via a current measuring device.

The above indicated object is also met according to a further teaching of the invention with the system mentioned at the beginning having a field device and a parameterization unit in that the configuration occurs according to at least one of the above-mentioned designs of the parameterization method. The parameterization system is generated, when necessary, only temporarily, in that the parameterization unit is connected to the field device for the duration of the configuration.

The field device is, in particular, an actuator or a measuring instrument. The parameterization unit is, for example, a control room, a (preferably portable) computer or a handheld, mobile operating device for field devices.

The process of generating test values or, respectively, their output, in one variation, can be switched on or off and possibly reserved only for special applications, such as those relative to safety.

In detail, there are a plurality of possibilities for designing and further developing the method according to the invention and the system according to the invention as will become apparent from the following description of embodiments in conjunction with the accompanying drawings.

DETAILED DESCRIPTION OF THE INVENTION

Figure 1:
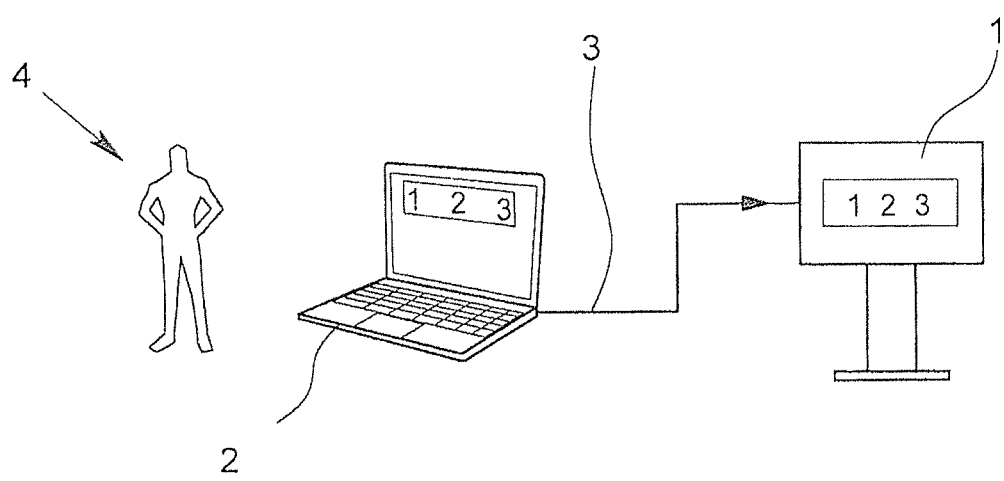
FIG. 1 is a schematic representation of a system for configuring a field device according to a first variation, indicating essentially the functional relationship using a block diagram.
Figure 2:
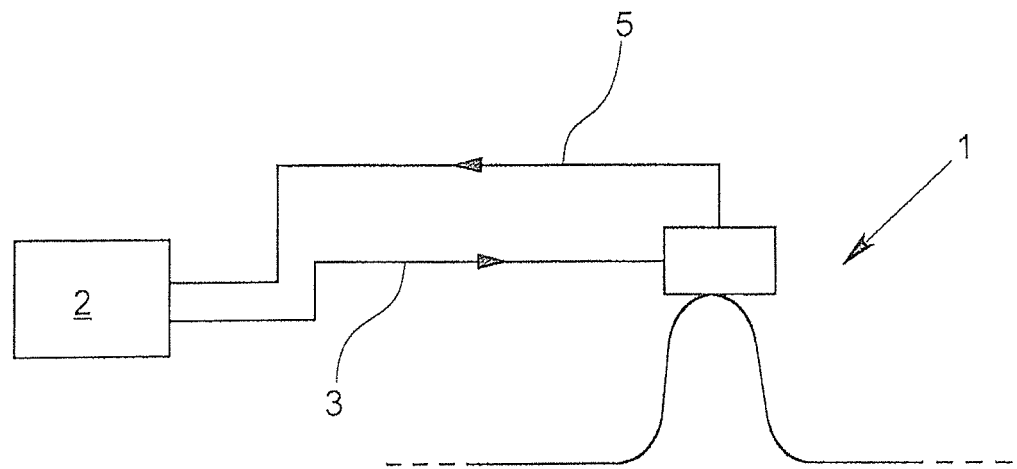
FIG. 2 is a schematic representation of a system for configuring a field device according to a second variation, indicating essentially the functional relationship using a block diagram.
Figure 3:
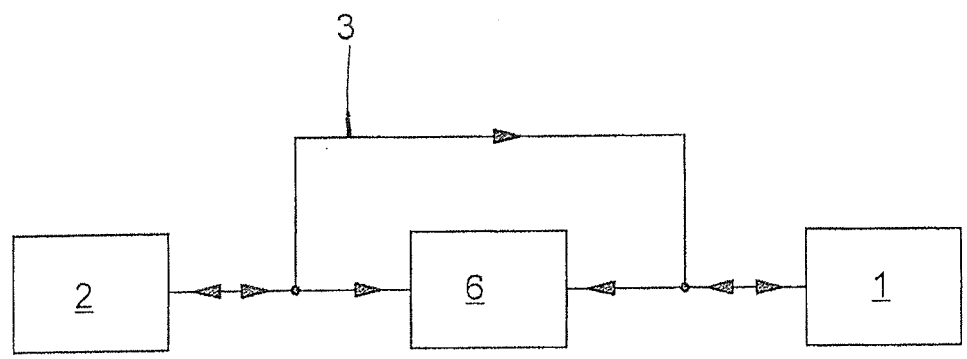
FIG. 3 is a schematic representation of a system for configuring a field device according to a third variation, indicating essentially the functional relationship using a block diagram.
Figure 4:
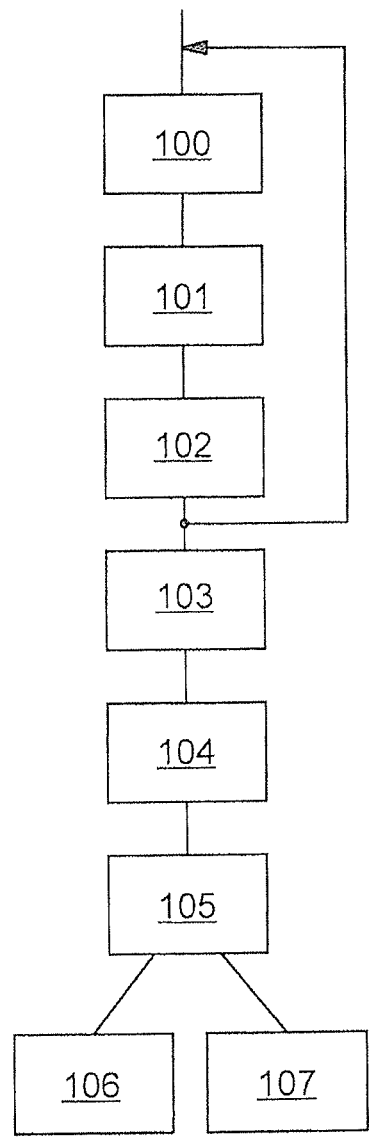
FIG. 4 is a flow chart of an implementation of the parameterization method.

In FIGS. 1 to 3, various embodiments of a parameterization system are shown, wherein the cause-effect relationships between the various elements will be explained. The sequence shown in FIG. 4 is an example for the combination and arrangement of steps of the parameterization method. Other embodiments of the system and other sequences of the steps are also possible and are within the scope of the invention.

FIG. 1 shows a—in particular, temporarily existing—system for configuration of a field device 1, being a fill level measuring device using microwaves. It is important, especially in safety-related field devices 1 that the field devices 1 function safely, which also includes safe configuration.

For the input of the parameter values in the arrangement of FIG. 1, a portable computer in the form of a laptop computer is used, which is connected to the field device 1 via a data link 3 in the form of a cable (a radio link would be alternatively possible). A HART input is used for this purpose in the field device 1, i.e., via an interface, which allows data communication by means of the HART protocol, frequently used in process automation.

The problem with data links in general, is the uncertainty of whether the value sent is identical to the one received. Furthermore, it can be expensive and complicated, especially when there is a large number of parameter values, if these are to be controlled individually.

Because of these problems, and in particular, for applications relative to safety, a first test value is generated by the parameterization unit 2 shown in FIG. 1, which reflects at least the at least one transmitted parameter value. At least one second test value is generated by the field device 1 from the transmitted parameter value. In the arrangement shown in FIG. 1, the parameterization unit 2 outputs the first test value and the field device 1 the second test value, each with its own display unit. The test values are read by an operator 4 and compared to one another. If the two test values agree with each other, the operator 4 knows that the transmitted parameter value agrees with the received parameter value. Upon this assumption, the operator 4 acknowledges the parameter value in the field device 1, so that it can be stored as a parameter value of the field device and be used for subsequent measurements.

Such visual displays of the field device 1 are subject to the condition that the field device 1 is accessible to an operator 4. Acoustic output of the second test value by the field device 1 can increase the tolerable distance between operator 4 and field device 1, but is still linked to correspondingly good environmental conditions. In the event that access to the second test value of the field device 1 is not directly possible or that the field device 1 does not have such an output option, alternatives are given by the designs of the parameterization unit of FIGS. 2 & 3.

In the system of FIG. 2, the parameterization unit 2 is a control room, which is connected with the field device 1 via a data link 3 for transmitting the at least one parameter value. The field device 1 is a mass flowmeter according to the Coriolis principle. The output of the second test value from the field device 1 occurs via an outlet of the field device 1 differing from the interface for data connection. For example, the second test value is converted into a current signal and transmitted to the parameterization unit 2, i.e., the control room, via the additional data link 5. Since communication only occurs in one direction—the parameter value is transmitted from the parameterization unit 2 to the field device 1 and the second test value is transmitted from the field device 1 to the parameterization unit 2—arrows are shown on the respective links 3, 5.

In this system of FIG. 2, the parameterization unit 2, itself, compares the two test values to one another. Alternatively, both test values are, in turn, output by the parameterization unit 2 in visually and/or acoustically and/or haptically and/or olfactorily registrable form for an operator 4, so that the parameterization unit 2 is used only for receiving the second test value and converting it into a form that can be more easily processed by the operator.

In the variation of FIG. 3, the field device 1 has only one signal input and output for a data link 3. In this variation, for example, the parameter value is received via the HART protocol and the second test value is encoded as a current value and output at the same interface as for the HART protocol. The comparison of the test values of the field device 1 and the parameterization unit 2 is carried out, in this design, by a comparing unit 6 independent of the two units 1, 2, the unit 6 being connected between the field device 1 and the parameterization unit 2 and receives test values from both (indicated by the arrows that each point at the comparing unit 6). The conversion of the parameter value goes past the comparison unit 6 (indicated here by the rerouting) or cannot be registered by it. Thus, a complete independence of the comparing unit 6 can be implemented.

FIG. 4 shows a flowchart of the steps of the parameterization method, as implemented in one of the systems described above, or in similarly designed parameter system. However, other step sequences or more steps are possible within the scope of the invention.

A parameter value to be set in a parameterization unit is chosen in step 100 or is entered by the operator. In step 101, the parameterization unit passes this parameter value on to the field device via the potentially unsafe data link and is received there in step 102 as a parameter value. Thereafter, in the course shown here, further parameter values are given (step 100), transmitted to the field device (step 101), and received there (step 102). Alternatively, several parameter values can be transferred or received at once.

Based on the parameter value to be transmitted or parameter values to be sent or transmitted, the parameterization unit generates, in step 103, a first test value and displays it on a display unit. In step 104, the field device generates a second test value on the other side based on the received parameter value or the received parameter values. Both the field device, as well as the parameterization unit, use the same algorithm for an as simple as possible comparison in generating test values, or the methods of generating such a checksum are known to the operator and allow for an appropriate conversion. In the illustrated variation, the field device also shows its, i.e., second, test value on a display unit.

In step 105, an operator compares the first to the second test value and arrives at a corresponding test result. In the simplest case, this is either "agreement" or "deviation". In the first, and thus, positive case, the operator confirms the parameter values in the field device in step 106, so that these can be used. In the alternative case of deviation, the configuration is interrupted and the operator starts a debugging operation or implements a different data transmission in step 107.

What is claimed is:

1. A method of configuring a field device in a parameterization system, comprising the steps of:

establishing at least one data connection between a field device and a parameterization unit, transmitting at least one parameterization value by the parameterization unit to the field device via said data connection receiving the at least one parameterization value by the field device, generating at least one first test value by the parameterization unit at least from the at least one parameterization value to be transmitted, generating at least a second test value by the field device at least from the at least one received parameterization value, outputting said second test value by the field device via a supplementary data link differing from said data connection, using both said data connection and said supplementary data link by said field device and by said parameterization unit, comparing at least the first test value to the second test value and generating a comparison result therefrom, and using the comparison result to modify operation by one of interrupting and debugging transmission if a deviation between the values compared is detected, and using the parameterization value transmitted to the field device if the compared values match.

2. A method of configuring a field device in a parameterization system, comprising the steps of:
- establishing at least one data connection between a field device and a parameterization unit,
- transmitting at least one parameterization value by the parameterization unit to the field device,
- receiving the at least one parameterization value by the field device,
- generating at least one first test value by the parameterization unit at least from the at least one parameterization value to be transmitted,
- generating at least a second test value by the field device at least from the at least one received parameterization value,
- outputting said second test value by the field device in a manner of transmission that differs from the manner of transmission of said parameterization value from said parameterization unit to said field device,
- using both of said manners of transmission by said field device and by said parameterization unit,
- comparing at least the first test value to the second test value and generating a comparison result therefrom, and
- using the comparison result to modify operation by one of interrupting and debugging transmission if a deviation between the values compared is detected, and using the parameterization value transmitted to the field device if the compared values match.

3. Method according to claim 2, wherein the second test value is supplied to the parameterization unit and that the first test value is compared to the second test value by the parameterization unit, and the comparison result is thus generated.

4. Method according to claim 1, wherein, depending on the comparison result, the parameter value received by the field device is set as a parameter value in the field device.

5. A parameterization system configuring a field device, comprising:
- a parameterization unit,
- at least one data connection between a field device and the parameterization unit, and
- a supplementary data link between said field device and said parameterization unit differing from said data connection,
- wherein the parameterization unit is adapted to transmit via said data connection at least one parameterization value to the field device which is adapted for receiving the at least one parameterization value,
- wherein the parameterization unit is also adapted for generating at least one first test value from the at least one parameterization value,
- wherein the field device is adapted for generating at least a second test value at least from the at least one parameterization value and for outputting said second test value via said supplementary data link to said parameterization unit,
- means for comparing at least the first test value to the second test value and generating a comparison result therefrom, and
- means for using the comparison result to modify operation by one of interrupting and debugging transmission if a deviation between the values compared is detected, and using the parameterization value transmitted to the field device if the compared values match.

6. System according to claim 5, wherein the field device is one of an actuator and a measuring device, and wherein the parameterization unit is one of a control station, a computer and a handheld device.

7. Method according to claim 2, wherein, depending on the comparison result, the parameter value received by the field device is set as a parameter value in the field device.

8. A parameterization system configuring a field device, comprising:
- a parameterization unit, and
- at least one data connection between a field device and said parameterization unit,
- wherein said parameterization unit is adapted to transmit at least one parameterization value to said field device which is adapted for receiving said at least one parameterization value,
- wherein said parameterization unit is also adapted for generating at least one first test value from said at least one parameterization value,
- wherein said field device is adapted for generating at least a second test value at least from said at least one parameterization value and for outputting said second test value in a manner of transmission that differs from the manner of transmission of said parameterization value from said parameterization unit to said field device,
- wherein both of said manners of transmission are adapted to be operated by said field device and by said parameterization unit,
- means for comparing at least said first test value to said second test value and generating a comparison result therefrom, and
- means for using the comparison result to modify operation by one of interrupting and debugging transmission if a deviation between the values compared is detected, and using the parameterization value transmitted to the field device if the compared values match.

* * * * *